US008868709B2

(12) United States Patent
Aboualy et al.

(10) Patent No.: US 8,868,709 B2
(45) Date of Patent: Oct. 21, 2014

(54) PROGRAMMATICALLY SELECTING A SERVICE PROVIDER BASED ON ASSURED QUALITY OF SERVICE ATTRIBUTES

(75) Inventors: Tamer Aboualy, Toronto (CA); Omkharan Arasaratnam, Ajax (CA); Stewart Wolfe, Ajax (CA); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 13/099,529

(22) Filed: May 3, 2011

(65) Prior Publication Data

US 2012/0284382 A1 Nov. 8, 2012

(51) Int. Cl.
 *G06F 15/173* (2006.01)
 *G06F 9/50* (2006.01)
 *H04L 12/24* (2006.01)
 *H04L 29/08* (2006.01)
 *H04L 29/06* (2006.01)

(52) U.S. Cl.
 CPC ........... *G06F 9/5055* (2013.01); *H04L 65/4084* (2013.01); *H04L 63/0823* (2013.01); *H04L 41/5067* (2013.01); *H04L 67/322* (2013.01); *H04L 41/509* (2013.01); *H04L 41/5003* (2013.01)
 USPC ........... 709/223; 709/224; 709/225; 709/226; 705/80; 726/1; 726/7

(58) Field of Classification Search
 CPC .............. G06F 9/5055; H04L 65/4084; H04L 63/0823; H04L 41/5067; H04L 67/322; H04L 41/509; H04L 41/5003
 USPC ....................... 709/223–226; 705/80; 726/1, 7
 See application file for complete search history.

(56) References Cited

U.S. PATENT DOCUMENTS 6,487,170 B1 11/2002 Chen et al.
6,854,056 B1 * 2/2005 Benantar et al. .............. 713/156
7,379,461 B2 5/2008 Wu et al.
(Continued)

FOREIGN PATENT DOCUMENTS

EP 2189905 11/2009
WO WO2010053534 5/2010

OTHER PUBLICATIONS

Network Working Group, RFC 2459, "Internet X.509 Public Key Infrastructure Certificate and CRL Profile", Internet Society, Jan. 1999.
Siani Pearson et al., "A Mechanism for Policy-Driven Selection of Service Providers in SOA and Cloud Environments", IEEE, p. 333-338, May 31, 2010—Jun. 2, 2010.
(Continued)

*Primary Examiner* — Hitesh Patel
(74) *Attorney, Agent, or Firm* — Law Offices of Ira D. Blecker, P.C.

(57) ABSTRACT

A method including querying a service provider for functional and nonfunctional qualifications of the service provider to provide a service having functional and nonfunctional requirements; responsive to input from the service provider, receiving by a requestor the functional qualifications and nonfunctional qualifications of the service provider including attesting by a third party, not the service provider or requestor, to at least the nonfunctional qualifications of the service provider; evaluating the functional qualifications and attested to nonfunctional qualifications of the service provider; and selecting a service provider having functional and attested to nonfunctional qualifications complying with the functional and nonfunctional requirements of the requestor. The method may be performed on one or more computing devices. Also disclosed is a computer program product.

16 Claims, 6 Drawing Sheets

(56) References Cited

U.S. PATENT DOCUMENTS

| | | | |
|---|---|---|---|
| 2008/0080396 A1 | 4/2008 | Meijer et al. | |
| 2009/0265473 A1 | 10/2009 | Hydrie et al. | |
| 2010/0049628 A1* | 2/2010 | Mannava et al. | 705/27 |
| 2010/0061250 A1 | 3/2010 | Nugent | |
| 2010/0131592 A1 | 5/2010 | Zhang et al. | |
| 2010/0235287 A1* | 9/2010 | Lymbery et al. | 705/80 |
| 2010/0235355 A1 | 9/2010 | Carter et al. | |
| 2011/0208606 A1* | 8/2011 | Hadar et al. | 705/26.2 |
| 2012/0066324 A1* | 3/2012 | Mampaey | 709/206 |
| 2012/0151057 A1* | 6/2012 | Paredes et al. | 709/225 |

OTHER PUBLICATIONS

Jim Longwood, "Evaluating, Selecting and Managing Cloud Service Providers: Leverage Key Outsourcing Lessons Learned", Gartner Research, ID No. G00166825, pp. 6-12, Jun. 26, 2009.

Mohammed Alhamad, "SLA-Based Trust Model for Cloud Computing", IEEE Computer Society, 2010 13th International Conference on Network-Based Information Systems, p. 321-324, Sep. 14-16, 2010.

Microsoft, "Description of the Secure Sockets Layer (SSL) Handshake", Article ID:257591, Jul. 7, 2008.

* cited by examiner

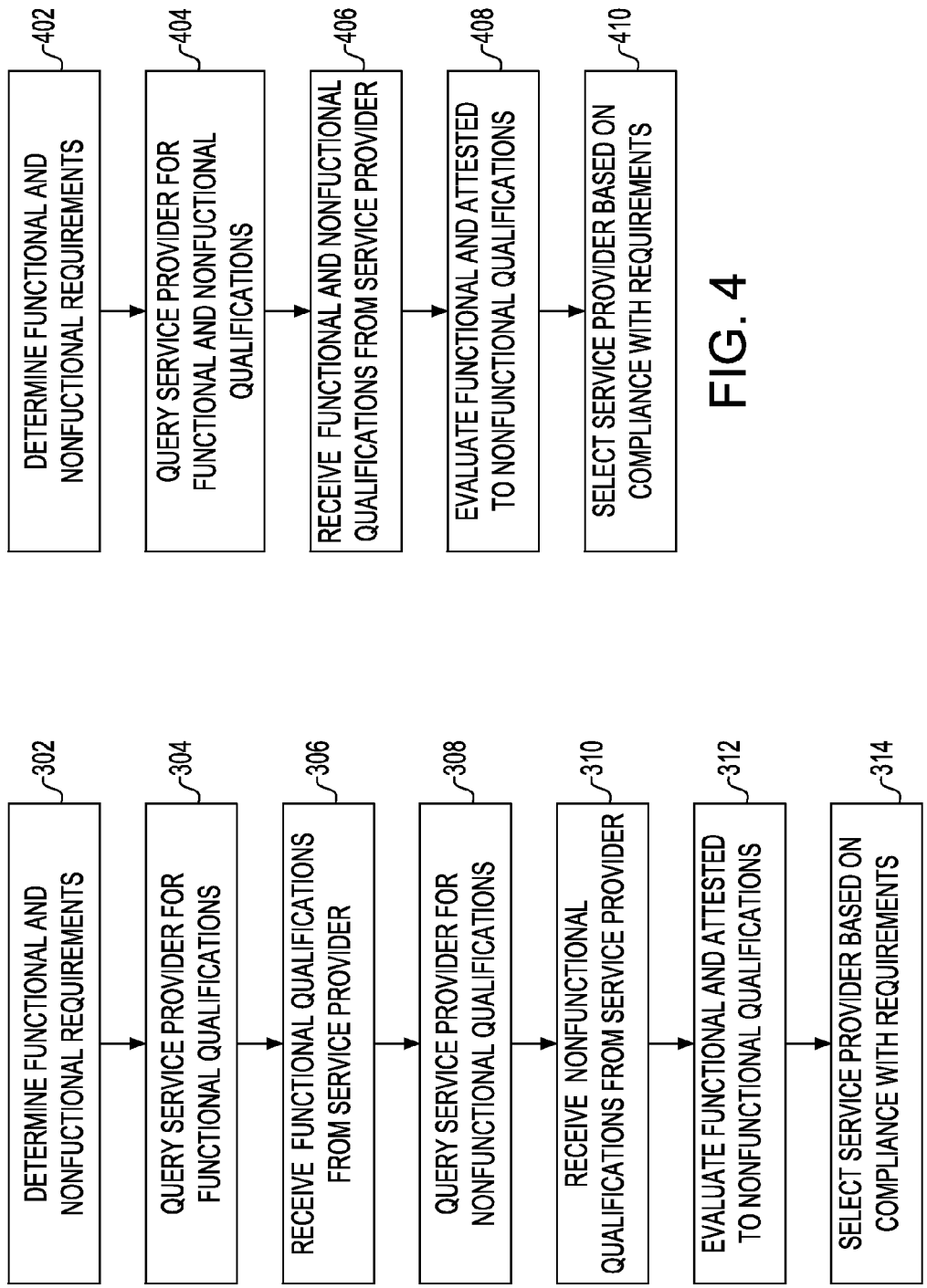

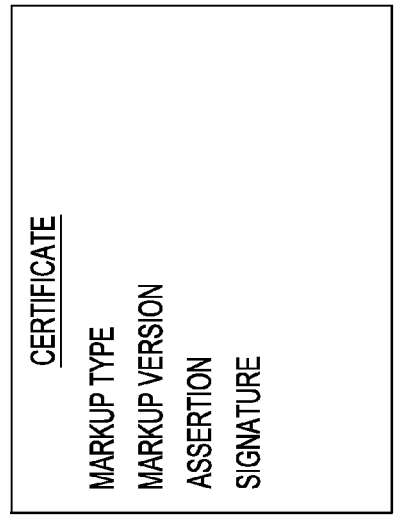
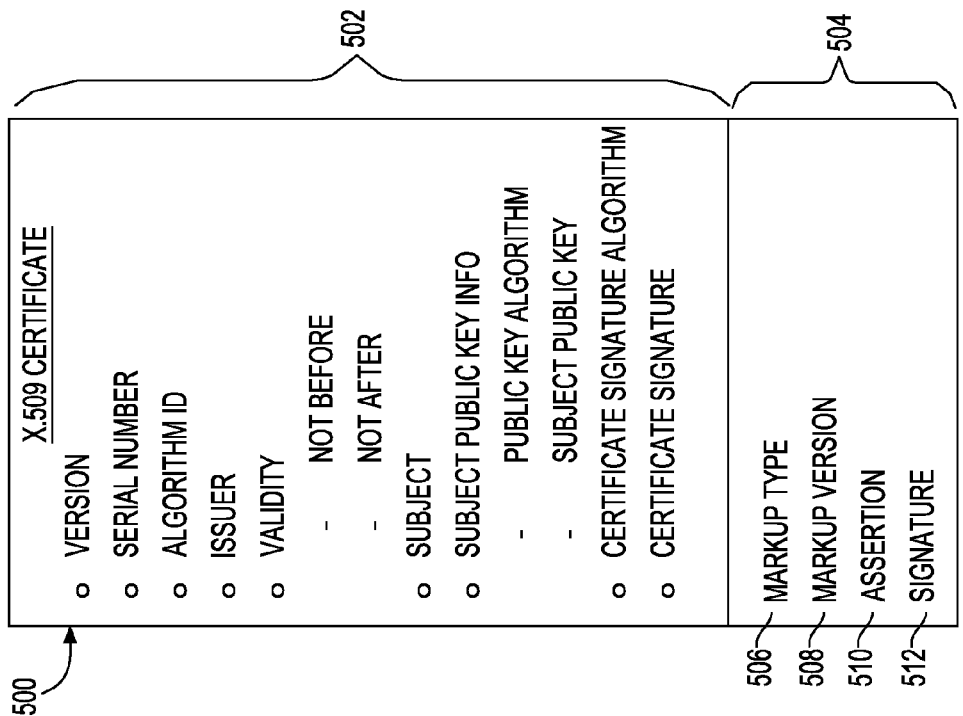

PROGRAMMATICALLY SELECTING A SERVICE PROVIDER BASED ON ASSURED QUALITY OF SERVICE ATTRIBUTES

BACKGROUND

The present invention relates to the process of selecting a service provider and, more particularly, relates to programmatically (automatically) selecting a service provider based on assured (or attested to) quality of service attributes.

Consumers who have access to computer networks such as the Internet can select from a number of different service providers to meet their need for services. These service providers assert many different requirements, both functional and nonfunctional. A functional requirement describes how something is executed while a nonfunctional requirement describes the qualities around execution. Nonfunctional requirements may also be referred to as quality of service requirements.

Currently, there is no efficient way for a consumer to interrogate multiple different service providers over the Internet and be assured of the ability of the service providers to fulfill the functional requirements and nonfunctional requirements of a proposed request for services.

BRIEF SUMMARY

The various advantages and purposes of the exemplary embodiments as described above and hereafter are achieved by providing, according to a first aspect of the exemplary embodiments, a method. The method includes querying a service provider for functional and nonfunctional qualifications of the service provider to provide a service having functional and nonfunctional requirements; responsive to input from the service provider, receiving by a requestor the functional qualifications and nonfunctional qualifications of the service provider including attesting by a third party, not the service provider or requestor, to at least the nonfunctional qualifications of the service provider; evaluating the functional qualifications and attested to nonfunctional qualifications of the service provider; and selecting a service provider having functional and attested to nonfunctional qualifications complying with the functional and nonfunctional requirements of the requestor. The method may be performed on one or more computing devices.

According to a second aspect of the exemplary embodiments, there is provided a method. The method includes determining by a requestor functional and nonfunctional requirements of a service to be provided by a service provider; querying a first plurality of service providers for functional qualifications of the first plurality of service providers to provide the service; responsive to input from the first plurality of service providers, receiving by the requestor the functional qualifications of the first plurality of service providers; querying a second plurality of service providers for nonfunctional qualifications of the second plurality of service providers to provide the service; responsive to input from the second plurality of service providers, receiving by the requestor the nonfunctional qualifications of the second plurality of service providers including attesting by a third party, not the service provider or requestor, to at least the nonfunctional qualifications of the second plurality of service providers; evaluating the functional qualifications of the first plurality of service providers and attested to nonfunctional qualifications of the second plurality of service providers; and selecting a service provider from the first and second plurality of service providers having functional qualifications and attested to nonfunctional qualifications complying with the fuiictional and nonfunctional requirements of the requestor. The method may be performed on one or more computing devices.

According to a third aspect of the exemplary embodiments, there is provided a computer program product for programmatically determining a cloud computing provider based on functional and nonfunctional requirements for a service to be provided by a service provider. The computer program product including a computer readable storage medium having computer readable program code embodied therewith. The computer readable program code including computer readable program code configured to query a first plurality of service providers for functional qualifications of the service provider to provide the service; responsive to input from the first plurality of service providers, computer readable program code configured to receive by a requestor the functional qualifications of the first plurality of service providers; computer readable program code configured to query a second plurality of service providers for nonfunctional qualifications of the second plurality of service providers to provide the service; responsive to input from the second plurality of service providers, computer readable program code configured to receive by the requestor the nonfunctional qualifications of the second plurality of service providers including to attest by a third party, not the service provider or requestor, to at least the nonfunctional qualifications of the second plurality of service providers; computer readable program code configured to evaluate the functional qualifications of the first plurality of service providers and attested to nonfunctional qualifications of the second plurality of service providers; and computer readable program code configured to select a service provider from the first and second plurality of service providers having functional qualifications and attested to nonfunctional qualifications complying with the functional and nonfunctional requirements of the requestor.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 3 is a flow chart illustrating a method according to an exemplary embodiment.

FIG. 4 is a flow chart illustrating a method according to a Variation of the exemplary embodiment in FIG. 3.

FIG. 5 depicts an x.509 digital certificate with an extension according to an exemplary embodiment.

FIG. 6 depicts a digital certificate according to an exemplary embodiment,

DETAILED DESCRIPTION

Figure 1:
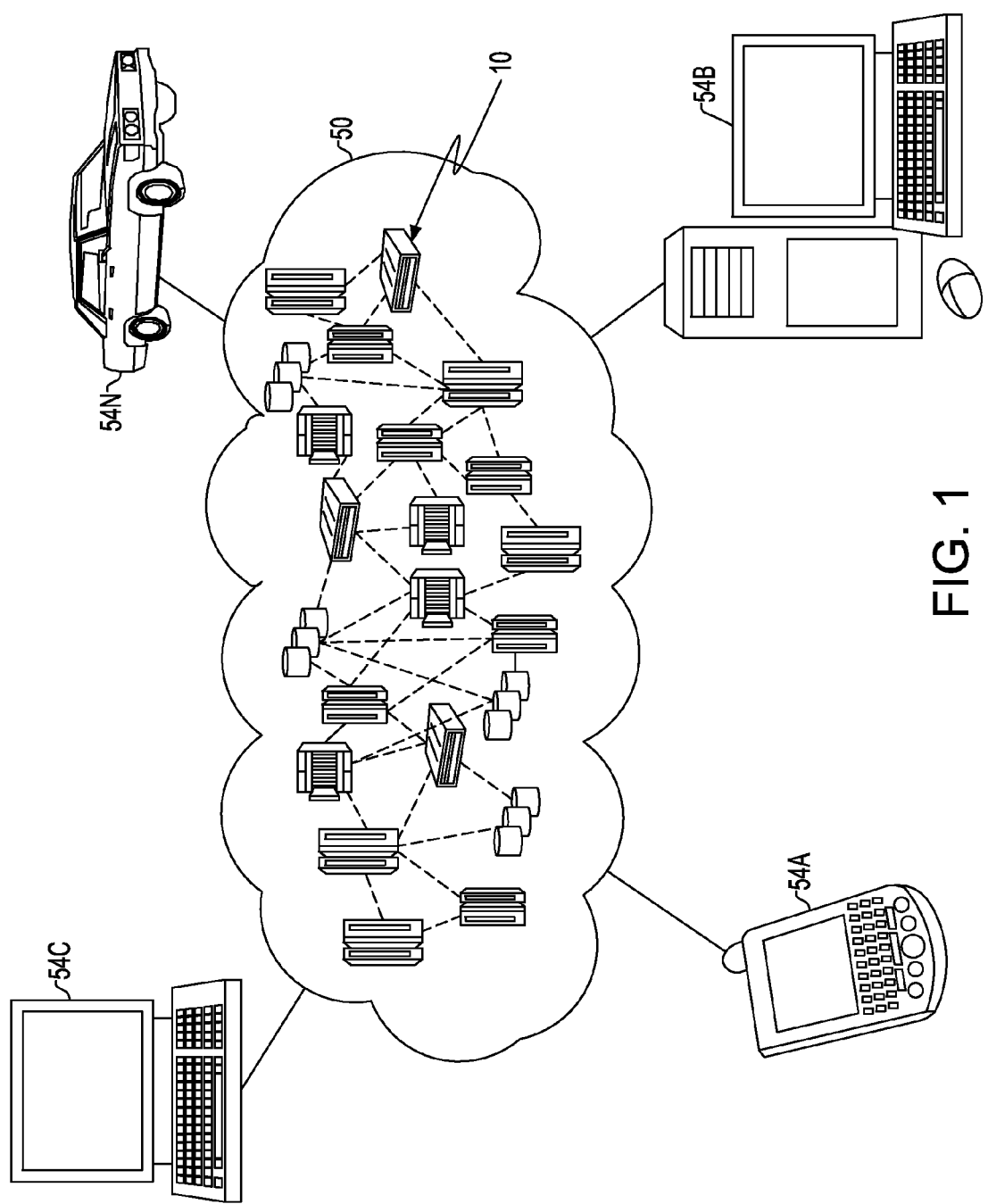
FIG. 1 depicts a cloud computing environment according to an exemplary embodiment.

The exemplary embodiments pertain to a programmatic methodology for a consumer to interrogate multiple different service providers over a computer network such as the Internet and be assured of the ability of the service providers to fulfill the functional requirements and nonfunctional requirements of a proposed request for services. The consumer may also be referred to hereafter as a requestor of services and both terms, consumer and requestor of services, may be used interchangeably herein. It is contemplated that once a requestor of services decides on the desired functional requirements and nonfunctional requirements of a proposed request for services, the exemplary embodiments, without requestor intervention, will seek out service providers having qualifications complying with the desired functional requirements and nonfunctional requirements of the proposed request for services.

It is most preferred that the exemplary embodiments operate in a cloud computing environment. Cloud computing permits transactional access to computing resources from a service provider for a discrete period of time. Cloud computing opens the possibility for consumers to eventually enter a free market model where the consumer might query many different service providers providing the same service and programmatically (i.e., automatically) select the best, cheapest and fastest service provider.

It is understood that although the exemplary embodiments include a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly, provisioned and released with minimal management effort or interaction with a provider of the service. This cloud computing model may include at least five characteristics as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
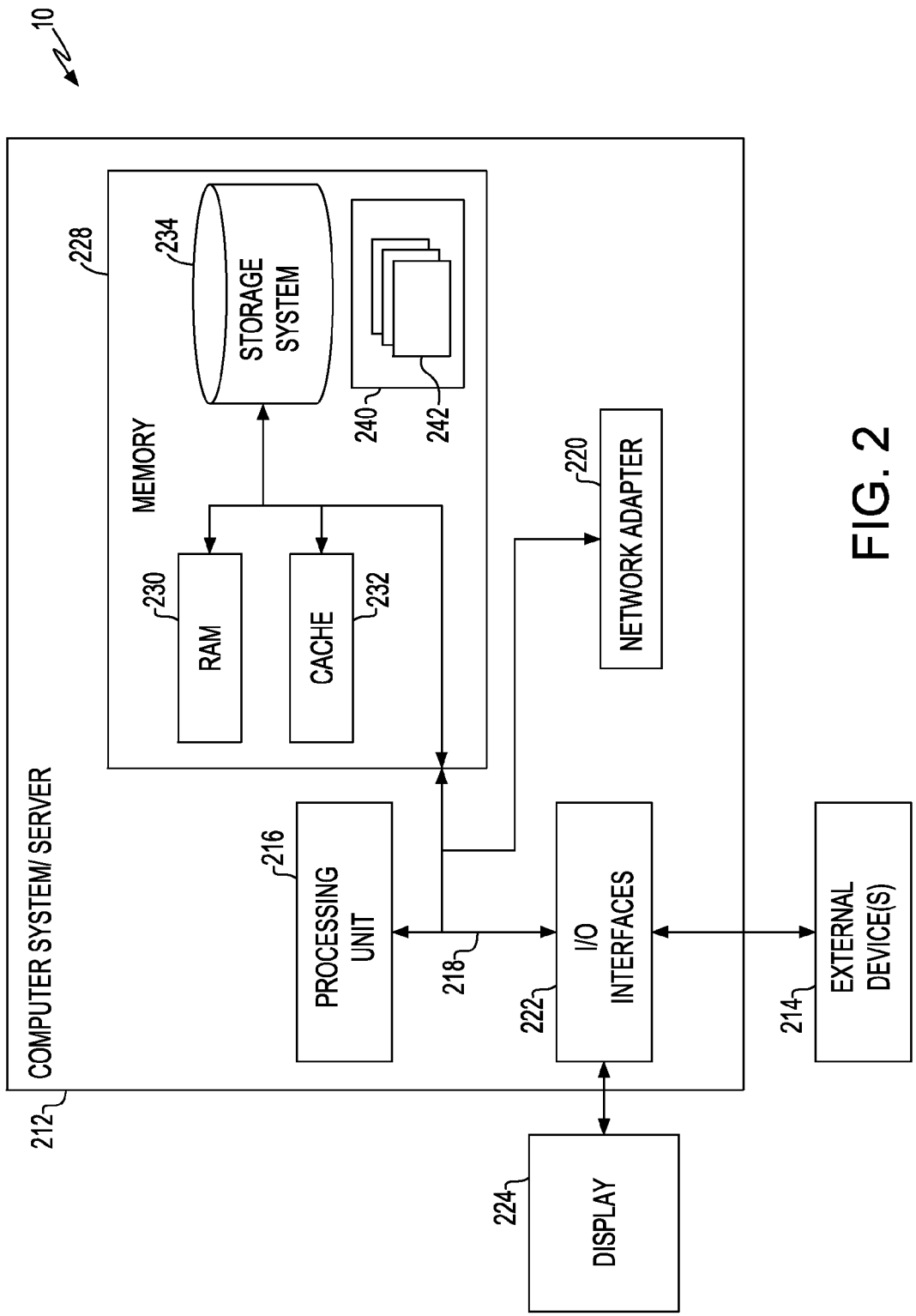
FIG. 2 depicts a cloud computing node according to an exemplary embodiment.

Referring now to FIG. 2, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node is capable of being implemented and/or performing any of the functionality set forth hereinabove.

In cloud computing node 10 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As shown in FIG. 2, computer system/server 212 in cloudicomputing node 10 is shown in the form of a general-purpose computing device. The components of computer system/server 212 may include, but are not limited to, one or more processors or processing units 216, a system memory 228, and a bus 218 that couples various system components including system memory 228 to processor 216.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, residentsoftware, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone-software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagramr block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 3, a method of the exemplary embodiments is illustrated. The method begins by a requestor determining the functional requirements and nonfunctional requirements of a service to be provided to the requestor by a service provider, box 302. Functional requirements define a function that a service provider's computing system is to accomplish. Functional requirements may be calculations, technical details, data manipulation and processing and other specific functionality that define what a system is supposed to accomplish. Another example of functional requirements is an application programming interface (API). Nonfunctional requirements define a quality of service of a service provider's computing system. Nonfunctional requirements may include, for example, performance, capacity, scalability, availability, maintainability, integrity, confidentiality, manageability, environmental, system usability and data integrity.

It is straight forward to determine a service provider's ability to comply with a functional requirement. However, it is much more difficult to determine a service provider's ability to comply with nonfunctional requirements.

The exemplary embodiments provide a methodology for determining a service provider's ability to comply with a requestor's functional requirements and nonfunctional requirements.

The requestor may query a service provider for the qualifications of the service provider to comply with the functional requirements of the requestor, box 304. This is straight forward as the requestor may request the service provider's computing system to comply with a particular functional requirement.

Responsive to input from the service provider responding to the query, the requestor may then receive the functional qualifications from the service provider box 306.

The requestor may query the service provider for the qualifications of the service provider to comply with the nonfunctional requirements of the requestor, box 308.

Responsive to input from the service provider responding, to the query, the requestor may receive the nonfunctional qualifications of the service provider, box 310. The nonfunctional qualifications in the exemplary embodiments are attested to by a third party so the requestor knows that the nonfunctional qualifications of the service provider can be trusted. The third party must not be either the service provider or the requestor.

In one exemplary embodiment, the third party may be a party trusted by the requestor that endorses the nonfunctional qualifications of the service provider. As examples, for purposes of illustration and not limitation, the third party may be an industry certifying group, an industry standards group, an auditor, a business partner or a colleague company. Thus, when the third party attests to the ability of the service provider to meet the nonfunctional requirements of the requestor, the requestor can trust that assertion.

In another exemplary embodiment, the third party may be reputation-based and accumulates endorsed evaluations by previous customers of the service provided by the service provider. As an example for purposes of illustration and not limitation, the third party may be a web site that accumulates the endorsed evaluations and the web site may be accessible by the requestor. The requestor of the service may view these previous evaluations as the trusted assertion of the service provider's ability to comply with the nonfunctional requirements of the requestor.

The requestor may evaluate the received functional qualifications and attested to nonfunctional qualifications for compliance with the functional requirements and nonfunctional requirements of the requestor, box 312. Resulting from the evaluation will be a determination of whether the service provider can meet the functional requirements and nonfunctional requirements of the requestor.

It should be understood that the requestor may evaluate the ability of the service provider to meet the functional requirements of the requestor after they have been received, as noted above with respect to box 306, or the requestor may evaluate the ability of the service provider to meet the functional requirements of the requestor at the same time as the requestor may evaluate the ability of the service provider to meet the nonfunctional requirements of the requester.

If the service provider can meet the functional requirements and nonfunctional requirements of the requestor, the requestor may select the service provider to provide the service, box 314.

In the method described above with respect to FIG. 3, a plurality of service providers may be queried for their ability to comply with the functional requirements of the requestor. Due to the number of cloud computing providers available, the described method is particularly suited to a programmatic determination of a suitable service provider meeting the functional and nonfunctional requirements of the requestor.

In an exemplary embodiment, only those service providers complying with the functional requirements of the requestor may be queried for their ability to comply with the nonfunctional requirements of the requestor. For this exemplary embodiment, the requestor may evaluate the ability of the service provider to meet the functional requirements of the requestor after they have been received, as noted above with respect to box 306, and before service providers are queried for their ability to meet the nonfunctional requirements of the requestor. In this way, a smaller universe of service providers may be queried for their ability to meet the nonfunctional requirements of the requestor. Thus, in this exemplary embodiment, the service providers queried for their ability to comply with the nonfunctional requirements of the requestor may be a subset of the service providers queried for their ability to comply with the functional requirements of the requestor.

Further to the method described above, a plurality of service providers may be queried for their ability to comply with the functional requirements of the requestor and a plurality of service providers may be separately queried for their ability to comply with the nonfunctional requirements of the requestor. During the evaluating step, the two pluralities of service providers may be evaluated to find common service providers that have the ability to comply with both the functional requirements and nonfunctional requirements of the requestor.

Referring now to FIG. 4, a variation of the method illustrated in FIG. 3 is illustrated. The method begins by a requestor determining the functional requirements and nonfunctional requirements of a service to be provided to the requestor by a service provider, box 402.

In this exemplary embodiment of the method, the requestor may query a service provider for the qualifications of the service provider to comply with the functional requirements of the requestor and for the qualifications of the service provider to comply with the nonfunctional requirements of the requestor, box 404. This methodology may not be as efficient as the methodology with respect to FIG. 3 since the querying will uncover service providers who may be able to comply with the functional requirements of the requestor but not the nonfunctional requirements and vice versa. However, there would only be one querying process involved which may simplify the method.

Responsive to input from the service provider responding to the query, the requestor may then receive the functional qualifications and nonfunctional qualifications from the service provider, box 406. As in the previous exemplary embodiment, the nonfunctional qualifications of the service provider are attested to by a third party so the requestor knows that the nonfunctional qualifications of the service provider can be trusted. The third party must not be either the service provider or the requestor.

The requestor may evaluate the received functional qualifications and attested to nonfunctional qualifications for compliance with the functional requirements and nonfunctional requirements of the requestor, box 408. Resulting from the evaluation will be a determination of whether the service provider can meet the functional requirements and nonfunctional requirements of the requestor.

If the service provider can meet the functional requirements and nonfunctional requirements of the requestor, the requestor may select the service provider to provide the service, box 410.

In the method described above with respect to FIG. 4, a plurality of service providers may be queried for their ability to comply with the functional requirements of the requestor. Due to the number of cloud computing providers available, the described method is particularly suited to a programmatic determination of a suitable service provider meeting the functional and nonfunctional requirements of the requestor.

In the above-described methods in FIG. 3 and 4, the nonfunctional qualifications in the exemplary embodiments are attested to by a third party so the requestor knows that the nonfunctional qualifications of the service provider can be trusted. The attestation may be conveniently provided in a number of ways. In one way, the attestation may be encrypted by an authenticating authority and provided to the requestor. Through public/private key technology, the requestor may be given a public key so as to be able to read the attestation.

In a second way of third party attestation, the requestor may be provided with a digital certificate that contains an assertion with respect to the service provider. For example, when requestor's computing system communicates with the service provider's computing system, there may be a secure socket layer (SSL) handshake during which the requestor computing system and service provider computing system are authenticated to each other. As part of the SSL handshake, the service provider computing system may provide the requestor computing system with an x.509 digital certificate. The x.509 is a standardized certification that allows computing systems to authenticate one another. X.509 is an ITU-T standard for a public key infrastructure (PKI) for single sign-on (SSO) and Privilege Management Infrastructure (PMI). X.509 specifies, amongst other things, standard formats for public key certificates, certificate revocation lists, attribute certificates, and a certification path validation algorithm.

An x.509 certificate 500 is illustrated in FIG. 5. The x.509 certificate 500 is divided into two parts, 502 and 504. Part 502 is the typical x.509 certificate containing a multiple of different fields, none of which are germane to the present invention.

Part 504 is an exemplary embodiment of an inventive extension to part 502 of the x.509 certificate. Part 504 includes a Markup Type field 506 for the type of markup language in the extension, a Markup Version field 508 for the version of the markup language, an Assertion field 510 which contains the assertion by the third party and a Signature field 512 which contains the digital signature of the third party and asserts that all of the fields in the part 504 are valid.

The extension shown in FIG. 5 as part 504 may be present as an extension to the x.509 certificate or it may form a digital certificate in and of itself as shown in FIG. 6.

Two implementations are presented which use the digital certificate shown in FIG. 5 for third party attestation. It should be understood that the following implementations are for purposes of illustration only and are not meant to be limiting of the exemplary embodiments.

Figure 7:
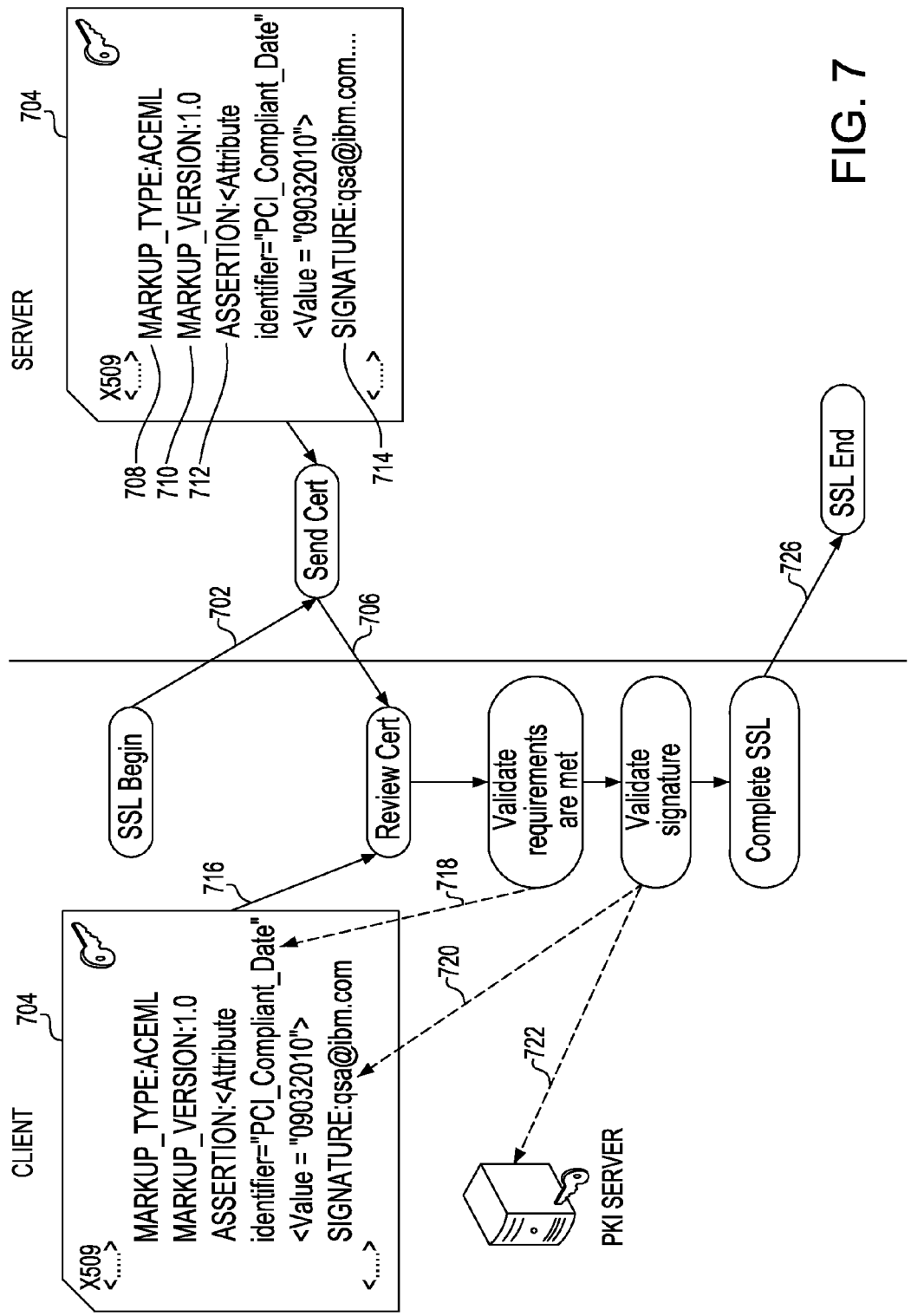
FIG. 7 depicts a first implementation of the exemplary embodiments.

Third Party Trusted by the Requestor:

The first implementation is illustrated in FIG. 7.

The requestor begins an SSL tunnel to the service provider as indicated by 702. Using the SSL tunnel is not a requirement of the present invention but is merely a convenient way to implement the exemplary embodiments.

Coincident with this implementation or separately from it, the requestor would determine the ability of the service provider to comply with the requestor's functional requirements.

The service provider through its server or computing system sends its x.509 certificate 704 to the requestor as indicated by 706 as part of the SSL handshake. The x.509 certificate 704 is similar to that illustrated in FIG. 5 and contains an extension having the fields noted in part 504 in FIG. 5. That is, the extension in x.509 certificate 704 contains the Markup Type: 708 indicating the ACEML markup language, its version 710 as 1.0, an assertion 712 that the service provider is PCI (Payment Card Industry) compliant (i.e., complies with the Payment Card Industry Security Standards Council) as of Sep. 3, 2010 and a digital signature 714 indicating that the digital signature is qsa@ibm.com. Thus, PCI is a trusted third party so when the x.509 certificate is passed to the requestor, the requestor can rely on the fact that the service provider is PCI compliant.

It is noted that the use of an x.509 certificate is not a requirement of the invention but is a convenient way to implement the exemplary embodiments. In a variation of this implementation, a typical x.509 certificate (without the inventive extension) may be sent by the service provider to the requestor and then separately, perhaps at the request of the requestor, the inventive certificate shown in FIG. 6 may be sent to the requestor.

The requestor reviews the x.509 certificate as indicated by 716 and evaluates (validates) 718 the service provider's nonfunctional qualification of being PCI compliant as of Sep. 3, 2010 and determines if this complies with the requestor's functional requirements.

If the nonfunctional requirements are met, the requestor continues to validate 720 the digital signature in the extension. Validation of the digital signature may be by, for example, a public key infrastructure (PKI) 722.

In the implementation shown in FIG. 7, the functional requirements and nonfunctional requirements have been met, the signature has been determined to be valid and the requestor completes the SSL handshake 724. The SSL handshake process may then end 726.

The requestor may then select the service provider to begin invocation of the service.

Figure 8:
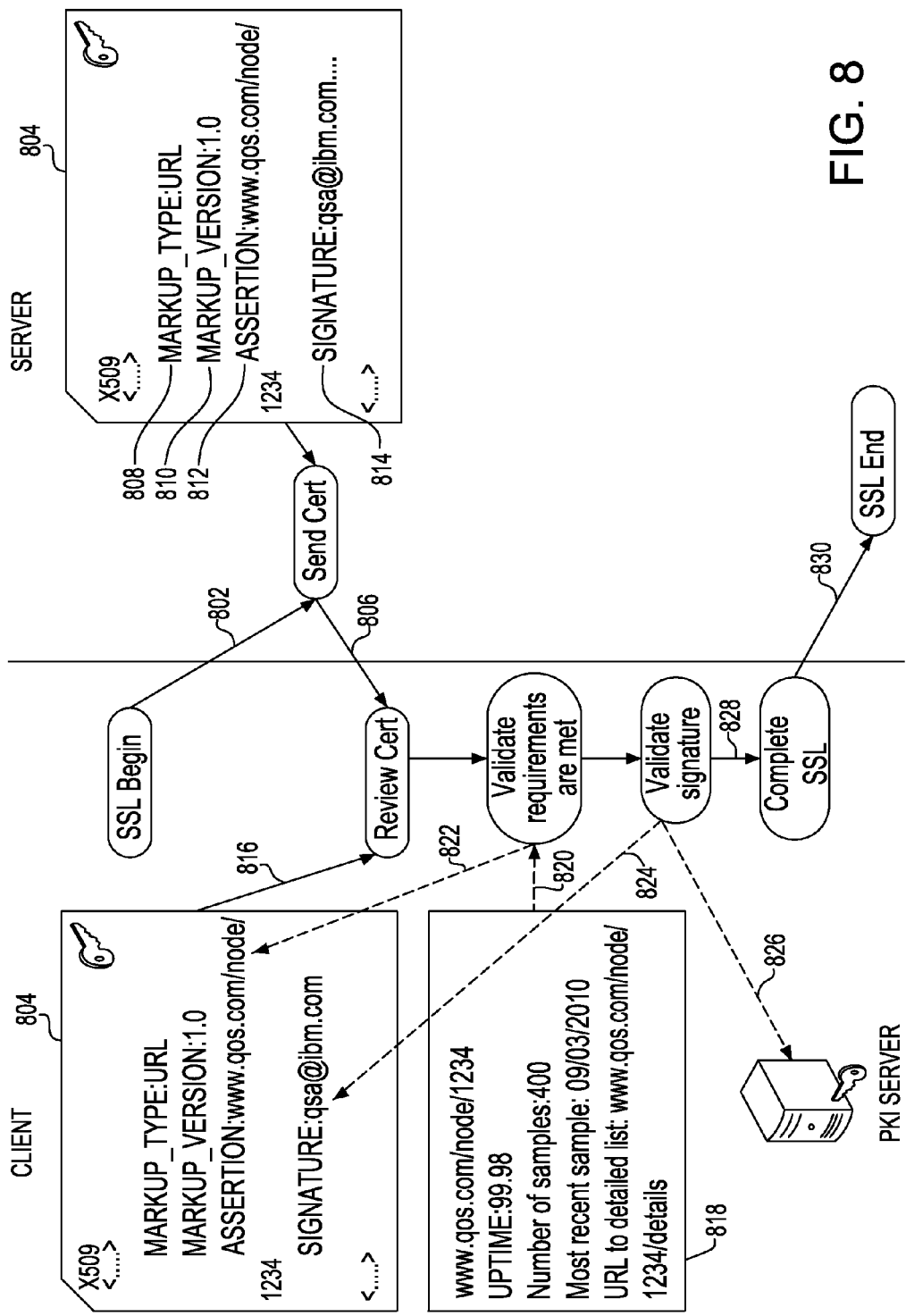
FIG. 8 depicts a second implementation of the exemplary embodiments.

Third Party Reputation Based:

The second implementation is illustrated in FIG. 8.

The requestor begins an SSL tunnel to the service provider as indicated by 802. Again, using the SSL tunnel is not a requirement of the present invention but is merely a convenient way to implement the exemplary embodiments.

Coincident with this implementation or separately from it, the requestor would determine the ability of the service provider to comply with the requestor's functional requirements.

The service provider through its server or computing system ends its x.509 certificate 804 to the requestor as indicated by 806 as part of the SSL handshake. The x.509 certificate 804 is similar to that illustrated in FIG. 5 and contains an extension having the fields noted in part 504 in FIG. 5. That is, the extension in x.509 certificate 804 contains the Markup Type: 808 as URL indicating it is a URL, its version 810 as 1.0, an assertion 812 that refers to a URL to a reputation-based assertion of uptime and a digital signature 814 indicating the digital signature as qs@ibm.com. The URL leads to a third party website having evaluations of previous engagement with the service, provider and can be trusted so when the x.509 certificate is passed to the requestor, the requestor can rely on the service provider's assertions of uptime.

Again, it is noted that the use of an x.509 certificate is not a requirement of the invention but is a convenient way to implement the exemplary embodiments. In a variation of this implementation, a typical x.509 certificate (without the inventive extension) may be sent by the service provider to the requestor and then separately, perhaps at the request of the requestor, the inventive certificate shown in FIG. 6 may be sent to the requestor.

The requestor reviews the x.509 certificate as indicated by 816 and accesses the URL 818 and the uptime-based information is transmitted 820.

The requestor evaluates (validates) 822 the service provider's nonfunctional qualification regarding uptime and determines if this complies with the requestor's functional requirements.

If the nonfunctional requirements are met, the requestor continues to validate 824 the digital signature in the extension of the x.509 certificate 804. Validation of the digital signature may be by, for example, a public key infrastructure (PKI) 826.

In the implementation shown in FIG. 8, the nonfunctional requirements have been met, the signature has been determined to be valid and the requestor completes the SSL handshake 828. The SSL handshake process may then end 830.

The requestor may then select the service provider to begin invocation if the service.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method comprising:
querying a service provider for functional and nonfunctional qualifications of the service provider to provide a service having the functional and the nonfunctional requirements;
responsive to input from the service provider, receiving by a requestor the functional qualifications and the nonfunctional qualifications of the service provider including attesting by a third party to at least the nonfunctional qualifications of the service provider, the third party being a party trusted by the requestor that endorses at least the nonfunctional qualifications of the service provider, wherein the third party is not the service provider and the third party is not the requestor and wherein attesting by a third party is provided in a certificate received by the requestor wherein the certificate includes at least the following fields: a type of markup language in the certificate, a markup type version, an attestation assertion that the service provider can meet at least one of the nonfunctional requirements of the requestor and a digital signature;
evaluating the functional qualifications and attested to the nonfunctional qualifications of the service provider; and
selecting a service provider having the functional qualifications and the attested to nonfunctional qualifications complying with the functional and the nonfunctional requirements of the requestor to begin invocation of the service from the service provider;
wherein the method is performed on one or more computing devices.

2. The method of claim 1 wherein the trusted third party is selected from the group consisting of an industry certifying group, an industry standards group, an auditor, a business partner of the requestor or a colleague company of the requestor.

3. The method of claim 1 wherein attesting by a third party includes a reputation-based assertion of the nonfunctional qualifications of the service provider.

4. The method of claim 1 wherein querying, providing and evaluating are each performed for a plurality of service providers.

5. The method of claim 1 wherein the service provider is a cloud computing provider.

6. A method comprising:
determining by a requestor functional and nonfunctional requirements of a service to be provided by a service provider;
querying a first plurality of service providers for the functional qualifications of the first plurality of service providers to provide the service;
responsive to input from the first plurality of service providers, receiving by the requestor the functional qualifications of the first plurality of service providers;
querying a second plurality of service providers for the nonfunctional qualifications of the second plurality of service providers to provide the service;
responsive to input from the second plurality of service providers, receiving by the requestor the nonfunctional qualifications of the second plurality of service providers including attesting by a third party to at least the nonfunctional qualifications of the second plurality of service providers, the third party being a party trusted by the requestor that endorses at least the nonfunctional qualifications of the service provider, wherein the third party is not the service provider and the third party is not the requestor and wherein attesting by a third party is provided in a certificate received by the requestor wherein the certificate includes at least the following fields: a type of markup language in the certificate, a markup type version, an attestation assertion that the service provider can meet at least one of the nonfunctional requirements of the requestor and a digital signature;
evaluating the functional qualifications of the first plurality of service providers and the attested to nonfunctional qualifications of the second plurality of service providers; and
selecting a service provider from the first and second plurality of service providers having the functional qualifications and the attested to nonfunctional qualifications complying with the functional and the nonfunctional requirements of the requestor to begin invocation of the service from the service provider;
wherein the method is performed on one or more computing devices.

7. The method of claim 6 wherein the trusted third party is selected from the group consisting of an industry certifying group, an industry standards group, an auditor, a business partner of the requestor or a colleague company of the requestor.

8. The method of claim 6 wherein attesting by a third party includes a reputation-based assertion of the nonfunctional qualifications of the service provider.

9. The method of claim 6 wherein the second plurality of service providers is a subset of the first plurality of service providers.

10. The method of claim 6 wherein the service provider is a cloud computing provider.

11. The method of claim 6 wherein the functional requirements define a function that a service provider's computing system is to accomplish.

12. The method of claim 6 wherein the nonfunctional requirements define a quality of service of a provider's computing system.

13. The method of claim 6 further comprising invoking the service of the selected service provider and providing an evaluation to the third party of the nonfunctional qualifications of the selected service provider.

14. A computer program product for programmatically determining a cloud computing provider based on functional and nonfunctional requirements for a service to be provided by a service provider, the computer program product comprising:
   a non-transitory computer readable storage medium having computer readable program code embodied therewith, the computer readable program code comprising:
   computer readable program code configured to query a first plurality of service providers for the functional qualifications of the service provider to provide the service;
   responsive to input from the first plurality of service providers, computer readable program code configured to receive by a requestor the functional qualifications of the first plurality of service providers;
   computer readable program code configured to query a second plurality of service providers for the nonfunctional qualifications of the second plurality of service providers to provide the service;
   responsive to input from the second plurality of service providers, computer readable program code configured to receive by the requestor the nonfunctional qualifications of the second plurality of service providers including to attest by a third party to at least the nonfunctional qualifications of the second plurality of service providers, the third party being a party trusted by the requestor that endorses at least the nonfunctional qualifications of the service provider, wherein the third party is not the service provider and the third party is not the requestor and wherein computer readable program code to attest by a third party is provided in a certificate received by the requestor wherein the certificate includes at least the following fields: a type of markup language in the certificate, a markup type version, an attestation assertion that the service provider can meet at least one of the nonfunctional requirements of the requestor and a digital signature;
   computer readable program code configured to evaluate the functional qualifications of the first plurality of service providers and the attested to nonfunctional qualifications of the second plurality of service providers; and
   computer readable program code configured to select a service provider from the first and second plurality of service providers having the functional qualifications and the attested to nonfunctional qualifications complying with the functional and the nonfunctional requirements of the requestor to begin invocation of the service from the service provider.

15. The computer program product of claim 14 wherein computer readable program code configured to attest by a third party includes a trusted third party endorsing the nonfunctional qualifications of the service provider or a reputation-based assertion of the nonfunctional qualifications of the service provider.

16. The computer program product of claim 14 wherein the second plurality of service providers is a subset of the first plurality of service providers.

* * * * *